(12) United States Patent
Cohen

(10) Patent No.: US 9,571,571 B2
(45) Date of Patent: Feb. 14, 2017

(54) PEER-TO-PEER LIVE STREAMING

(75) Inventor: Bram Cohen, Mill Valley, CA (US)

(73) Assignee: BitTorrent, Inc., San Francisco, CA (US)

( * ) Notice: Subject to any disclaimer, the term of this patent is extended or adjusted under 35 U.S.C. 154(b) by 459 days.

(21) Appl. No.: 13/603,395

(22) Filed: Sep. 4, 2012

(65) Prior Publication Data

US 2013/0066969 A1    Mar. 14, 2013

Related U.S. Application Data

(63) Continuation-in-part of application No. 13/407,635, filed on Feb. 28, 2012.

(60) Provisional application No. 61/447,583, filed on Feb. 28, 2011.

(51) Int. Cl.
*H04L 29/08* (2006.01)
*H04L 29/06* (2006.01)

(52) U.S. Cl.
CPC ....... *H04L 67/104* (2013.01); *H04L 29/08306* (2013.01); *H04L 65/4084* (2013.01)

(58) Field of Classification Search
CPC .............. H04L 29/08306; H04L 29/08333; H04L 67/1008; H04L 67/06; H04L 67/1002–67/1023; H04L 12/1812–12/1877; H04L 12/5695; H04L 45/00–45/02; H04L 47/10; H04L 65/4084; H04L 67/104–67/1095
USPC ....... 709/204, 219, 223, 229, 241, 246, 201, 709/231; 370/252; 725/9
See application file for complete search history.

(56) References Cited

U.S. PATENT DOCUMENTS

| | | | |
|---|---|---|---|
| 6,862,618 B1 | 3/2005 | Gray et al. | |
| 8,949,436 B2 * | 2/2015 | Rimac | H04L 67/104 709/227 |
| 9,094,263 B2 * | 7/2015 | Cohen | H04L 29/08333 |
| 2003/0055892 A1 * | 3/2003 | Huitema | H04L 29/06 709/204 |

(Continued)

FOREIGN PATENT DOCUMENTS

| | | |
|---|---|---|
| RU | 2368000 C2 | 9/2009 |
| WO | WO 2008/002295 A1 | 1/2008 |
| WO | WO 2009/101443 A2 | 8/2009 |

OTHER PUBLICATIONS

Karbhari et al, "Bootstrapping in Gnutella: A Preliminary Measurement Study" May 2003.*

(Continued)

*Primary Examiner* — Wing F Chan
*Assistant Examiner* — Raji Krishnan
(74) *Attorney, Agent, or Firm* — Fenwick & West LLP

(57) ABSTRACT

According to a peer-to-peer protocol, a peer-to-peer network includes multiple clubs and multiple peers that receive content distributed by a source of the network. Each of the multiple peers is part of at least two of the clubs. A joining peer identifies a club of the peer-to-peer network to join and receives identifying information for peers in the identified club. The joining peer randomly selects from the peers in the identified club at least a first peer and a second peer with which to establish connections. The random selection is proportionally weighted by the number of connections the first peer has with other peers and the number of connections the second peer has with other peers. The joining peer establishes a first connection with the first peer and a second connection with the second peer.

13 Claims, 6 Drawing Sheets

(56) References Cited

U.S. PATENT DOCUMENTS

| | | | |
|---|---|---|---|
| 2004/0143672 A1* | 7/2004 | Padmanabham et al. | 709/231 |
| 2005/0086287 A1* | 4/2005 | Datta | 709/201 |
| 2005/0086288 A1* | 4/2005 | Datta | H04L 45/02 709/201 |
| 2006/0007947 A1 | 1/2006 | Li et al. | |
| 2006/0215574 A1* | 9/2006 | Padmanabhan | H04L 12/2697 370/252 |
| 2007/0280255 A1* | 12/2007 | Tsang | H04L 12/5695 370/395.2 |
| 2008/0291916 A1 | 11/2008 | Xiong et al. | |
| 2009/0042562 A1 | 2/2009 | Treesh et al. | |
| 2009/0172157 A1* | 7/2009 | Zhang | H04L 67/104 709/224 |
| 2009/0177792 A1* | 7/2009 | Guo | H04N 7/17336 709/231 |
| 2009/0210545 A1* | 8/2009 | Wright | H04L 67/104 709/230 |
| 2009/0265473 A1 | 10/2009 | Hydrie et al. | |
| 2010/0153578 A1 | 6/2010 | Van Gassel et al. | |
| 2011/0047215 A1 | 2/2011 | Guo et al. | |
| 2011/0060798 A1 | 3/2011 | Cho et al. | |
| 2011/0083015 A1 | 4/2011 | Meier | |
| 2011/0219137 A1* | 9/2011 | Yang et al. | 709/231 |
| 2012/0151051 A1* | 6/2012 | Zhang | H04L 67/06 709/224 |
| 2012/0221640 A1 | 8/2012 | Cohen | |
| 2012/0221692 A1 | 8/2012 | Steiner et al. | |
| 2012/0278500 A1 | 11/2012 | Ganjam et al. | |
| 2013/0064090 A1* | 3/2013 | Maenpaa | H04L 67/104 370/235 |
| 2013/0066969 A1 | 3/2013 | Cohen | |
| 2015/0131529 A1* | 5/2015 | Zhou | H04W 84/18 370/328 |

OTHER PUBLICATIONS

Asvanund et al, "Intelligent Club Management in Peer-to-Peer Networks" May 2003.*

Izal et al, "Dissecting BitTorrent: Five Months in a Torrent's Lifetime" PAM 2004.*

United States Office Action, U.S. Appl. No. 13/407,635, Sep. 25, 2014, 22 pages.

Patent Cooperation Treaty, International Search Report and Written Opinion, International Patent Application No. PCT/US2012/027025, Mailed Dec. 20, 2012, 7 Pages.

Asvanund, A. et al., "Intelligent Club Management in Peer-to-Peer Networks," Proceedings of the First Workshop on Economics of P2P, May 2003, pp. 1-6.

Izal, M. et al., "Dissecting BitTorrent: Five Months in a Torrent's Lifetime," PAM 2004, Passive and Active Network Measurement, LNCS 3015, 2004, pp. 1-11.

Karbhari, P. et al., "Bootstrapping in Gnutella: A Preliminary Measurement Study," May 2003, pp. 1-7.

United States Office Action, U.S. Appl. No. 13/407,635, Apr. 4, 2014, 21 pages.

European Extended Search Report, European Application No. 12782724.4, Dec. 22, 2015, 9 pages.

\* cited by examiner

PEER-TO-PEER LIVE STREAMING

CROSS-REFERENCE TO RELATED APPLICATION

This application is a continuation-in-part of application Ser. No. 13/407,635, filed on Feb. 28, 2012, which claims the benefit of U.S. Provisional Application No. 61/447,583, filed Feb. 28, 2011, each of which is incorporated by reference herein in its entirety.

BACKGROUND

The embodiments described generally relate to peer-to-peer networks, particularly to a peer-to-peer protocol for streaming content.

A peer-to-peer network includes multiple peers that have established connections with each other. Each peer acts both as a supplier (i.e., sender) and consumer (i.e., receiver) of resources, which is different than the traditional client-server model in which servers supply and clients consume.

A peer-to-peer network may be used to distribute live content (e.g., stream a recording of a live event) to multiple peers. One way of distributing live content is by having each peer of the network forward each data block of the content received to its neighboring peers. This approach involves significant overhead in that each peer will receive the same block multiple times from different peers. Another way of distributing live content is to have each peer explicitly request data blocks needed from other peers. However, this approach may result in the latency (i.e., the amount of time it takes the peer to receive a data block) being high.

SUMMARY

The embodiments described herein provide a protocol for streaming content in peer-to-peer networks. According to the protocol, a peer-to-peer network includes multiple clubs and multiple peers that receive content distributed by a source of the network. Each of the plurality of peers is part of at least two of the clubs. As content is generated, the source divides the content into multiple data blocks and assigns each data block to a club. Each data block is transmitted to peers that belong to the club assigned to the data block. When a peer in a club receives a data block assigned to that club, the peer distributes the data block to other peers in the club. Additionally, the peer transmits the data block to peers in other clubs. Also, the peer receives data blocks assigned to other clubs from peers that are not members of the club.

The figures depict various embodiments for purposes of illustration. One skilled in the art will readily recognize from the following discussion that alternative embodiments of the structures and methods illustrated herein may be employed without departing from the principles described herein.

DETAILED DESCRIPTION

Overview

Figure 1:
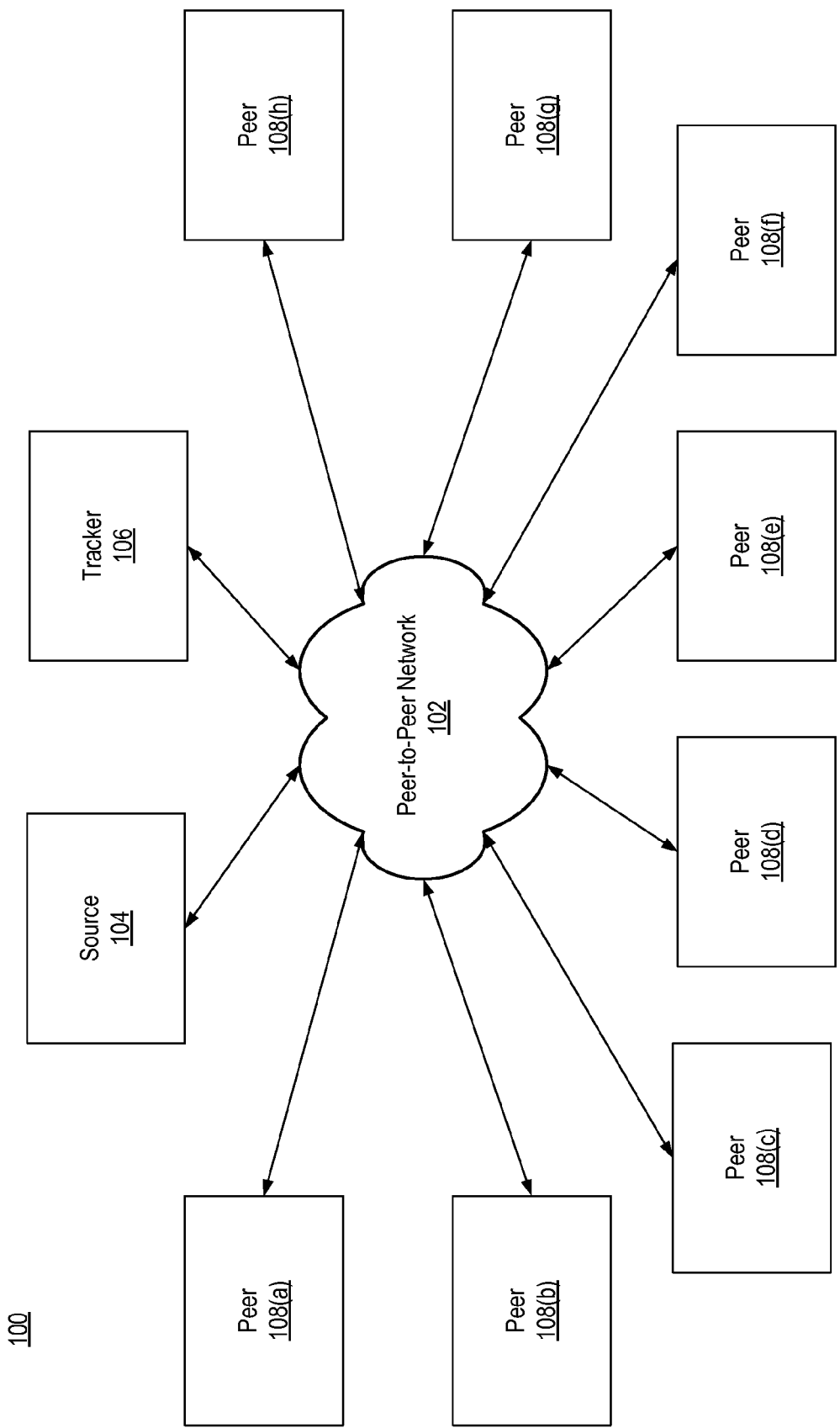
FIG. 1 is a block diagram of a networking environment, according to one embodiment.

FIG. 1 is a block diagram of a networking environment 100 according to one embodiment. The environment 100 includes a source 104, a tracker 106, and peers 108(a) through 108(h) communicating via a peer-to-peer network 102. The source 104 creates connections with peers 108 and peers 108 create connections with each other to form the peer-to-peer network 102. The source 104 and peers 108 share content according to a peer-to-peer protocol described herein. The peer-to peer protocol allows content to be streamed in the peer-to-peer network 102 and is specifically useful for streaming live content because of its low latency and low overhead qualities. Although the illustrated environment 100 only includes a single source, a single tracker, and a limited number of peers, other embodiments include additional numbers of each (e.g., more peers).

The source 104 is a computer system that provides content shared among the peers 108 of the network 102 (i.e., brings the content into network 102). In one embodiment, the content is a feed of multimedia content (e.g., video and/or audio). In one embodiment, the content is a live feed that is being generated as it is being streamed within the network 102. The source 104 distributes the content to peers 108 of the network 102 according to the peer-to-peer protocol described below. The source 104 and the peers 108 sharing the content may collectively be referred as a swarm or the peer-to-peer network 102.

The tracker 106 is a computer system that keeps track of the peers 108 that are part of the swarm. In one embodiment, the tracker 106 maintains a list of the peers 108 of the swarm. For each peer of the swarm, the tracker 106 in one embodiment includes an Internet Protocol (IP) address and port number of the peer (identifying information). When a peer joins the swarm, the tracker 106 adds the IP address and port number of the peer to the list. In one embodiment, each peer of the swarm periodically transmits a message to the tracker 106 to notify the tracker 106 that it is still part of the swarm. If the tracker 106 does not receive a message from a peer within a certain amount of time, it removes the peer from the list and the peer is no longer part of the swarm.

The tracker 106 assists a peer in joining the swarm. In one embodiment, the tracker 106 assists by providing the peer with the list or a portion of the list so that the peer can create connections with the peers 108 of the swarm.

Each peer is a computer system with capabilities to receive data from other peers 108 (i.e., download) and transmit data to other peers 108 (i.e., upload). A peer may be, for example, a personal computer, a mobile phone, a tablet, a personal digital assistant (PDA), a television set-top box or any other network-capable device. In one embodiment, each peer stores a computer program that manages downloads from peers 108 and uploads to peers 108 according to the peer-to-peer protocol.

Computer Architecture

Figure 2:
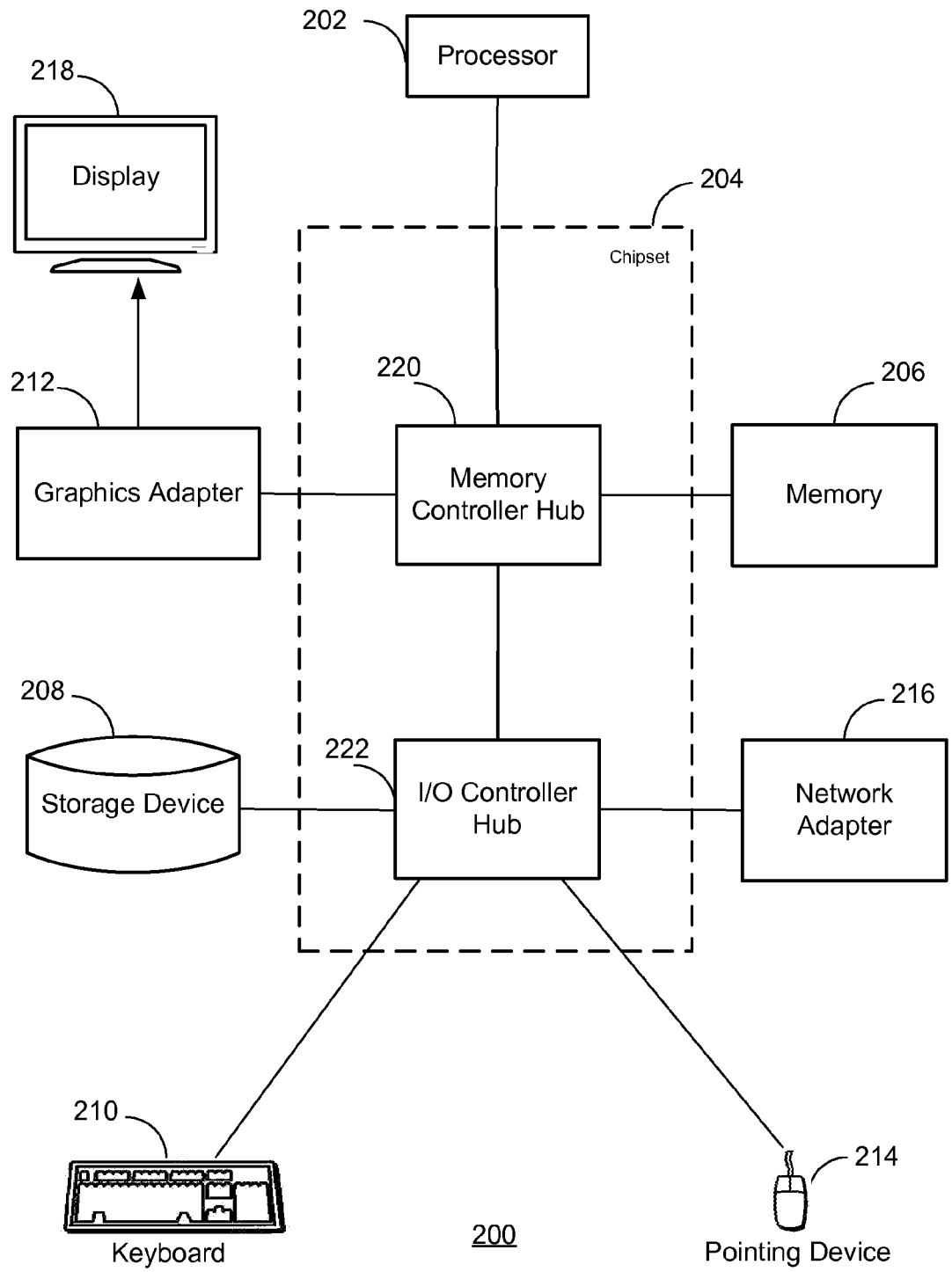
FIG. 2 is a block diagram illustrating a functional view of a typical computer system for use as a source, a tracker, and/or a peer, according to one embodiment.

FIG. 2 is a block diagram illustrating a functional view of a typical computer system 200 for use as the source 104, the tracker 106, and/or a peer. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 allows the computer system 200 to communicate via the peer-to-peer network 102. Some embodiments of the computer system 200 have different and/or other components than those shown in FIG. 2.

The computer system 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The type of computers systems 200 used by the source 104, the tracker 106, and peers 108 can vary depending upon the embodiment and the processing power used. For example, the computer system of a peer may have less processing power than the computer system of the source 104 or the tracker 106.

Network Architecture

In one embodiment, according to the peer-to-peer protocol, the swarm/network 102 has a number of clubs and each peer of the swarm is a part of a club. In one embodiment, the swarm has a total of twelve clubs. However, in other embodiments more or fewer clubs may be included. Each club includes the source 104 and a subset of peers 108 of the swarm that have self-declared to the club.

In one embodiment, each peer is a part of multiple clubs (e.g., 2 clubs). This helps distribute upload capacity among the clubs. For example, assume that there are twelve clubs, only eight peers of the swarm have good upload capacity, and each peer joins only one club. Since each peer joins only one club, at least four of the clubs will not have a peer with good upload capacity and the upload capacity of each of those four clubs may be insufficient. On the other hand, if each of the eight peers with good upload capacity joins two clubs, there is a high probability that each club will include one of the eight peers.

Figure 3:
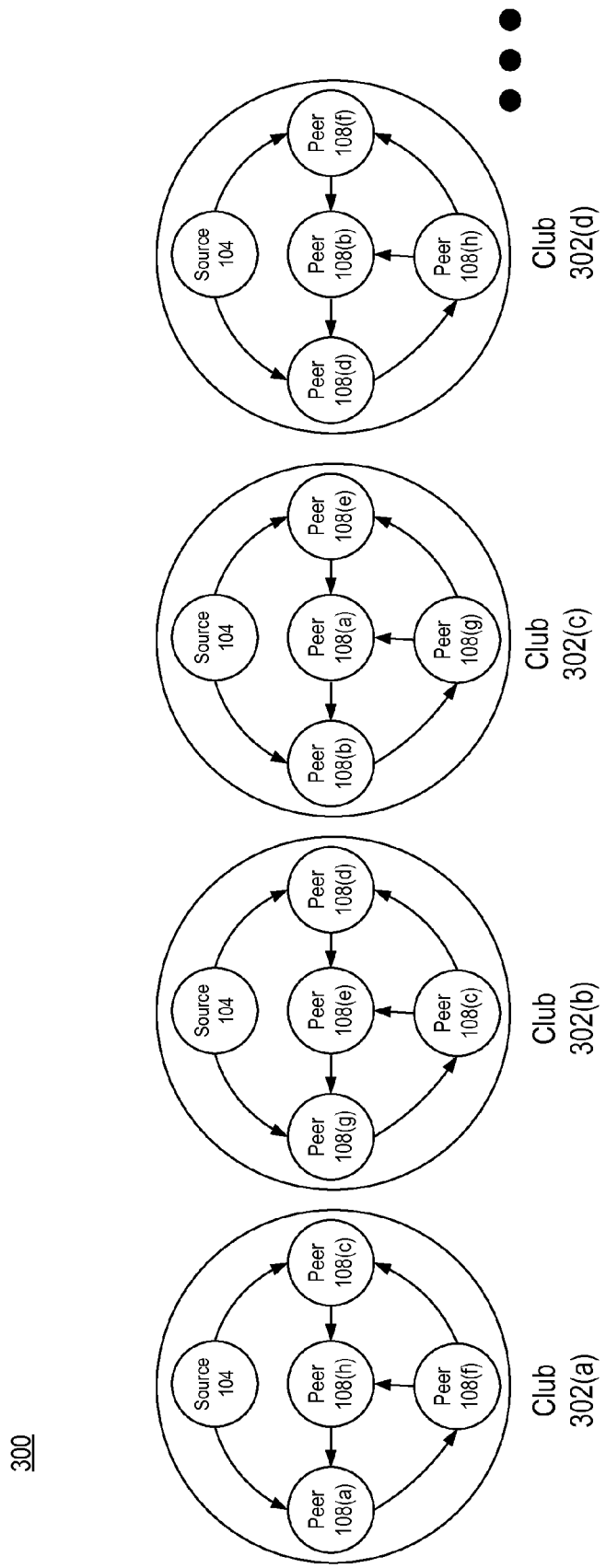
FIG. 3 is a block diagram of an architecture of a peer-to-peer network, according to one embodiment.

FIG. 3 illustrates an example of an architecture 300 of the network 102 according to the peer-to-peer protocol. FIG. 3 shows four clubs (302(a), 302(b), 302(c), and 302(d)) out of twelve in the swarm. As can be seen, the source 104 is part of each club and in this example each peer is part of two of the twelve clubs. For example, peer 108(a) is part of clubs 302(a) and 302(c).

The source 104 and the peers 108 of a club establish connections with each other. In one embodiment, the connections are unidirectional User Datagram Protocol (UDP) connections. In a unidirectional connection the connection is between a transmitting peer and a receiving peer. The transmitting peer transmits data via the connection to the receiving peer, but the receiving peer does not transmit data to the transmitting peer via that connection.

In one embodiment, each peer of a club strives to have a particular number of upload connections and download connections with other peers 108 in the club 302. In one embodiment, each peer of a club strives to have no more than three and no less than two of each type of connection (upload and download connections) in the club in order to be able to quickly distribute data within the club and keep overhead low. For example, if a peer in a club only has one download connection in the club, the peer will seek to create another download connection in the club. Similarly, if the peer has four upload connections in the club, the peer may drop one of the upload connections. In other embodiments, a peer in a club strives to have more than three or fewer than two of each type of connection.

In an upload connection of a peer, the peer is the transmitting peer of the unidirectional connection. In a download connection of a peer, the peer is the receiving peer of the unidirectional connection. For example, in FIG. 3, peer 108(f) in club 302(a) has two upload connections with peers 108(h) and 108(c) and one download connection with peer 108(a).

Each peer within a club also has connections with peers 108 in other clubs 302. In one embodiment, each peer in a club also strives to have a download connection with a peer in each club that it is not a part of. These download connections allows the peer to receive data that is not assigned to its clubs as will be described in more detail below. For example, in FIG. 1, peer 108(c) in club 302(a) may have a download connection with peer 108(b) in club 302(c), as well as a download connection with peer 108(d) in club 302(d).

In one embodiment, the source 104 has two upload connections with peers 108 in each club. For example, in club 302(c), the source 104 has upload connection with peers 108(b) and 108(e). In other embodiments, the source 104 has more or fewer than two upload connections in a club.

Joining the Network

According to the peer-to-peer protocol, when a peer wishes to join the swarm to obtain content provided by the source 104, the peer transmits a request to the tracker 106 for information about peers 108 in the swarm. The tracker 106 provides the peer with a complete or partial list of the peers 108 that are part of the swarm (i.e., identifying information of the peers in the swarm) and notifies the peer of the total number of clubs 302 in the swarm. In one embodiment, the tracker 106 also recommends to the peer clubs of the swarm to join. In one embodiment, the tracker 106 recommends to the peer two clubs to join. In one embodiment, the clubs are only a recommendation and the peer can select to join any of the clubs 302. In another embodiment, the peer is required to join the recommended clubs.

In one embodiment, to make a recommendation to a joining peer as to which clubs 302 to join, the tracker 106 creates a recommendation list that includes the clubs 302 of the swarm. The tracker 106 shuffles the clubs 302 in the list.

Each time a new peer requests to join the swarm, the tracker 106 recommends, for example, the top two clubs 302 in the recommendation list and removes them from the list. The tracker 106 continues to do this until there are no more clubs 302 in the list. Once no more clubs 302 are in the list, the tracker 106 recreates the list. This process for recommending clubs allows the clubs 302 to be balanced in terms of number of peers 108. In other embodiments, the tracker uses other load-balancing algorithms to recommend clubs.

The joining peer uses the list of peers 108 provided by the tracker 106 to create the connections necessary under the protocol (i.e., connections with peers in the selected clubs and connections with peers not in the selected clubs). In one embodiment, to create a connection with another peer in a club, the joining peer sends a request to peers 108 included in the list asking for information on peers 108 that they are aware of in the club. The peers 108 receiving the message respond with peers 108 that are in the club. The responses include the IP addresses and port numbers of the peers 108 in the club.

In one embodiment, the joining peer transmits a ping to peers 108 that are in the club. The joining peer receives ping responses from the peers 108. Based on the ping responses, the joining peer selects a peer in the club with which to create a connection, for example by picking among the available peers at random proportionally weighted by the number of total current upload connections they reported having in their ping responses. For in club connections, peers might also use ping response information about the number of current uploads or downloads in the same club as the new connection.

In another embodiment, the response from each peer 108 includes the number of uploads and downloads the peer is currently participating in, both within its club and outside of its club. The joining peer picks randomly among the peers that have the fewest uploads, and establishes a connection with that peer.

In one embodiment, as noted above, the joining peer also establishes connections to peers outside of the club it is joining. The joining peer receives ping responses from each peer, and each response includes the number of uploads currently being provided by that peer. The joining peer then randomly selects from among peers 108, weighted by the number of uploads the currently providing (rounding up to 1 in the case of a 0).

The joining peer communicates with the selected peers and the connection is created. In one embodiment, the addresses of peers that were pinged are stored for possible use the next time the joining peer needs to create a connection. In one embodiment, the ping responses are also stored.

In one embodiment, a peer that is already part of the swarm creates a connection with a peer in a club in a similar way as described for the joining peer. One difference is that instead of sending the request to peers 108 in a list received from the tracker 106, the request is transmitted to peers 108 in the swarm with whom the creating peer already has connections.

In one embodiment, when the creating peer receives information on peers 108 in the club, the creating peer transmits a ping to peers 108 in the club from which the creating peer has not received a ping response recently (i.e., in a set period of time). If the creating peer recently received a ping response from a peer in the club when creating another connection, the creating peer will use that ping response to determine whether to create a connection with the peer.

Based on the ping responses and a ban list of the creating peer, the creating peer selects a peer in the club with which to create a connection. The ban list includes peers 108 with which the creating peer previously had connections and had to drop the connections. Details as to how a peer is added to the ban list are provided below. In one embodiment, the creating peer gives higher priority to creating connections with peers 108 not on the ban list. In one embodiment, the creating peer will not create a connection with a peer on the ban list.

Content Distribution

According to the peer-to-peer protocol, as a feed of content is being generated, the feed is received by the source 104, for example, from a media capturing device. In one embodiment, the source 104 receives the content feed via Real Time Messaging Protocol (RTMP). As the content feed is being received by the source 104, the source 104 divides the content feed into data blocks that are approximately the same size. In one embodiment, the blocks are sequentially numbered. Each block of data is assigned to a club. In one embodiment, to determine which club a block is assigned, the source 104 determines the sequence number of the block modulo the number of clubs 302 of the swarm. The result of the operation is the club to which the block is assigned.

In one embodiment, an authentication signature is attached with each data block so that the peers 108 can determine that the data block is from the source 104 and is not an invalid data block. In one embodiment, an authentication signature is created for every set number of data blocks in the sequence (i.e., a signature is created for a batch of data blocks). For example, an authentication signature may be created for every 12 data blocks in the sequence. The authentication signature of a batch is attached to each data block of the batch.

In one embodiment, the authentication signature of a batch is the root hash of a hash tree. To create the hash tree, a hash is created of each data block of the batch. The hashes of the data blocks are the first level of the hash tree. Every two hashes of the data blocks are hashed together to create the second level of the hash tree. Additional levels are created by hashing two child hashes together until a final level is created with only the root hash.

The source 104 transmits each data block assigned to a club to peers 108 in the club with which the source 104 has upload connections. For example, in FIG. 3, for a data block assigned to club 302(*d*), the source 104 would transmit the block to peers 108(*d*) and 108(*f*). In one embodiment, in addition to transmitting a data block with its respective authentication signature, the source 104 transmits certain hashes of the corresponding hash tree used to generate the signature in order to allow the receiving peer to verify the authentication signature of the block.

In one embodiment, the source 104 also includes an estimate of the bit rate of the content feed with each data block transmitted. The estimated bit rate allows the peers 108 to know the rate at which to upload data blocks. In one embodiment, for a time interval the source 104 determines the estimated bit rate of the content feed based on the number of data blocks transmitted by the source in the previous time interval.

In one embodiment, the source 104 adjusts the determined estimated bit rate of the current time interval based on a difference between an estimated bit rate of the previous time interval and the actual number of data blocks transmitted in the previous time interval. In one embodiment, if the estimated bit rate determined for the time interval is less than the estimated bit rate of the previous time interval, the source 104 takes the difference between the previous estimated bit rate and the determined estimate bit rate. The source 104 sets the estimated bit rate of the current time interval to be the previous estimated bit rate minus a fraction of the difference (e.g., 0.6 of the difference). A benefit of this approach is that the bit rate is dropped asymptotically.

In one embodiment, when a peer in a club receives a data block assigned to the club, the peer authenticates the data block using the signature attached to the data block and hashes of the corresponding hash tree received. If the peer is unable to authenticate the data block, the data block is dropped. On the other hand if the peer is successful in authenticating the data block, the peer prepares the block for playback and notifies other peers 108 in the club with which the peer has a download connection that it already received the data block. Notifying the other peers prevents the peer from receiving multiple copies of the data block (i.e., it reduces the number of redundant transmissions within the club). As an example, in FIG. 3, when peer 108(a) in club 302(a) receives from the source 104 a data block assigned to club 302(a), peer 108(a) notifies peer 108(h) that it already received the data block.

For each receiving peer in the club with which the peer has a download connection, the peer transmits the data block to the receiving peer if no message was received indicating that the receiving peer already received the data block. For example, when peer 108(a) in club 302(a) receives the data block assigned to club 302(a), peer 108(a) transmits the block to peer 108(f) as long as no message was received that peer 108(f) already has the block. A benefit of each peer in a club striving to have at least two download connections and at least two upload connections within the club is that it allow blocks assigned to the club to be distributed within the club at an exponential speed.

The peer also provides the data block to peers 108 in other clubs 302 with which the peer has upload connections. However, the peer gives a higher priority to routing the data block to peers that are members of the club of the data block. In one embodiment, if a certain number of data blocks in a row are transmitted by the peer within the club (e.g., 9 data blocks in a row), the peer transmits a data block out of club. This helps prevent the starvation of upload connections with peers in other clubs.

In one embodiment, anytime the peer transmits a data block to a receiving peer, the peer also transmits hashes corresponding to the hash tree used to generate the authentication signature of the block. The hashes are needed by the receiving peer in order to authenticate the data block. In one embodiment, the peer keeps track of which hashes and signatures have been sent to or generated by receiving peer. The next time a data block is transmitted to the receiving peer, if a hash or signature that needs to be sent to the receiving peer for authentication was previously sent for another data block, it is not retransmitted by the peer. The receiving peer can use the previously received hash or signature to authenticate the new data block.

In one embodiment, when a peer receives a data block from a club that the peer does not belong to, the peer does not distribute the data block to the other peers 108 (e.g., peers within its club). In other words, in this embodiment, each peer relies on the peers 108 in other clubs 302 to receive data blocks that are not assigned to its respective clubs 302.

Congestion Control

Under the peer-to-peer protocol, for purposes of congestion control, under certain situations a connection may be dropped. In one embodiment, a data block received by a peer via a download connection triggers congestion control if the one-way delay (i.e., the latency) of the block is above a threshold time. In one embodiment, the threshold time is set by a system administrator. In one embodiment, the threshold time is included in the data block. The peer receiving the data block measures the delay by subtracting the time at which the block was received from a transmit time included in the data block. The receiving peer compares the calculated delay to the threshold time. If the delay is above the threshold time, the download connection is dropped by the receiving peer.

In one embodiment, when a data block is received by a peer via a download connection, the receiving peer drops the download connection if a sequence number of the data block is a value other than that the sequence number of the previous data block received plus one. When the sequence number of a data block is not what is expected, it indicates that an intervening data block was dropped, which typically means congestion control is needed.

In one embodiment, a receiving peer of a download connection will drop the connection if a set period of time has passed since the receiving peer last received a data block via the connection. This action is especially beneficial for download connections with peers 108 in different clubs 302 because it ensures that the receiving peer will receive the data blocks that it needs from the other clubs 302. In one embodiment, a transmitting peer of an upload connection will drop the connection if the transmitting peer does not receive a keep-alive message within a set period of time since the last keep-alive message was received from the receiving peer of the connection. The keep-alive message indicates to the transmitting peer to maintain the connection.

In one embodiment, when a peer is the initiator of dropping a connection for one of the reasons described, the peer adds the other peer of the dropped connection to a ban list of the peer. As described above, the ban list is used by the peer when creating new connections. In one embodiment, after a peer has been on the ban list for a certain period of time, the peer is removed from the list.

In another embodiment, every set amount of time (e.g., every 5 seconds), for each peer on the banned list, the peer randomly determines whether to remove the banned peer from its list (i.e., the peer decides with some probability whether to remove the banned peer). For example, the peer may roll an eight sided dice for a banned peer. If an eight is rolled the banned peer is removed.

In one embodiment, when a connection is dropped, whether a replacement connection is created depends on the type of the connection dropped and which side it is being viewed from. From the side of the receiving peer of the dropped connection, if the receiving peer is not in the same club as the transmitting peer of the dropped connection, the receiving peer creates a replacement download connection with another peer in the club of the transmitting peer. The connection is created using the process described above for creating a connection. In one embodiment, when the new download connection is created, the receiving peer notifies the other peer via a bit field which data blocks of its club it already has so that the other peer knows which blocks to transmit. In one embodiment, the bit field is run length encoded using Elias coding in order to keep the encoding length to a minimum.

On the other hand, if the receiving peer is in the same club as the transmitting peer of the dropped connection, whether a replacement connection is created depends on how many remaining download connections the receiving peer has in the club. In one embodiment, if remaining number of download connections is equal to the number of download connections the peer strives to have in the club (e.g., 2), no new connection is created. In one embodiment, if the remaining number of download connections is less than the number of download connections the peer strives to have, the receiving peer creates a new download connection with a peer in the club using the process described above.

From the side of the transmitting peer, if the receiving peer of the dropped connection is in a different club than that of the transmitting peer, the transmitting peer does not attempt to replace the connection. If the receiving peer was in the same club as that of the transmitting peer, whether a replacement connection is created depends on how many remaining upload connections the transmitting peer has. In one embodiment, if remaining number of upload connections is equal to or greater than the number of upload connections the peer strives to have, a replacement connection is not created. In one embodiment, if the remaining number of upload connections is fewer than the number of upload connections the peer strive to have, the receiving peer creates a replacement upload connection using the process described above.

In one embodiment, when a peer (non-initiating peer) receives from another peer (initiating peer) a request to create a connection with it in a certain direction (upload or download connection), the non-initiating peer allows the creation of the connection. If the initiating peer is in the same club as the non-initiating peer and the new connection causes the non-initiating peer to have more connections in one direction than it strives to have, the non-initiating peer drops one of the connection in that direction. In one embodiment, the non-initiating peer randomly selects the connection to drop. In another embodiment, the non-initiating peer drops the oldest or newest connection.

Playback

Under the peer-to-peer protocol, as a peer of the swarm receives data blocks of the content being streamed by the source 104, the peer reassembles the content by ordering the data blocks according to their respective sequence number. In one embodiment, a media player of the peer plays back the ordered data blocks of the streaming content. In one embodiment, initial playback of the content begins once the peer has received data blocks worth a certain amount of playback time (e.g., one second of playback).

The peer seeks to play data blocks with a play delay that is within a reasonable range from the time the source sent out the data block into the swarm. If the peer determines that the play delay is less than the reasonable range, the peer causes the playback to slow down in order to prevent noticeable freezes as the content is being played. If the play delay is more than the reasonable range, the peer causes the content to be played faster in order to catch up.

In one embodiment, as the content is being played back, if the peer has not received the next data block to be played, the peer causes the playback of the data block to be skipped. In another embodiment, if the peer has not received the next data block to be played, the peer freezes the playback for at most a set amount of time. If the block is received by the peer within the set amount of time, the playback is restarted upon receipt. If the block is not received within the set amount of time, the playback is restarted but the block is skipped.

Graceful Failure of a Peer

In one embodiment, each peer of the swarm periodically determines a measure of how well data from the source 104 is being distributed within the swarm (i.e., a quality measure of the swarm). In one embodiment, the quality measure is determined based on the number of times within a certain time period that one or more data blocks were skipped during playback because they were not received from other peers in time. In one embodiment, the quality measure is determined based on the number of times within a certain time period that playback was frozen because one or more data blocks were not received from other peers in time. Each quality measure has an upload threshold associated with it. If the current upload rate of the peer is less than the upload threshold associated with the determined quality measure, the peer stops all download and upload activity. A benefit of this approach is that it prevents the swarm from becoming overloaded.

Processes

Figure 4:
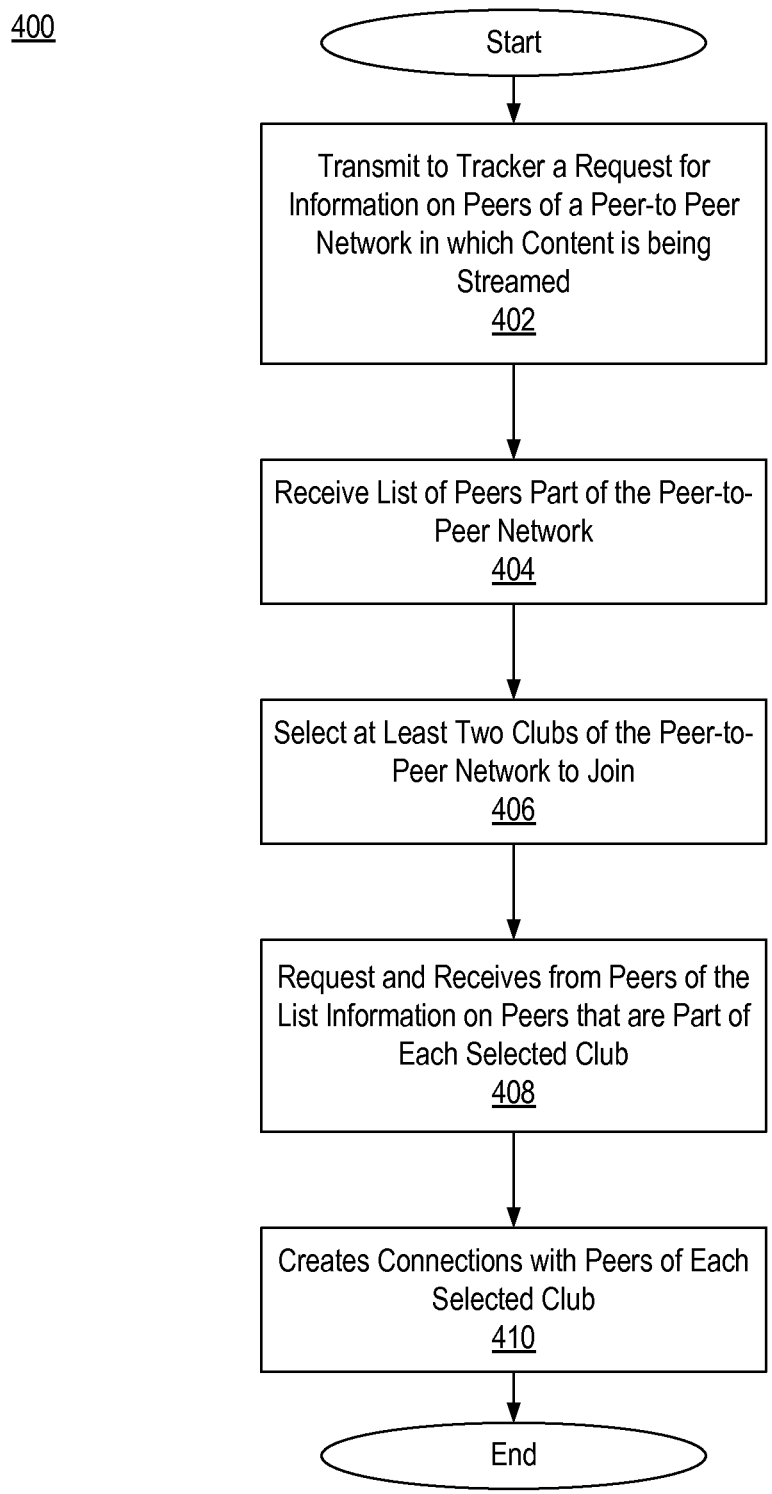
FIG. 4 is a flow chart illustrating a process of a peer joining a peer-to-peer network to receive content, according to one embodiment.

FIG. 4 is a flow chart illustrating a process 400 of a peer joining the peer-to-peer network 102 according to the peer-to-peer protocol. The peer transmits 402 a request to the tracker 106 for information on peers 108 that are part of the peer-to-peer network 102 in which content is being streamed by the source 104. The peer receives 404 from the tracker 106 a list of peers 108 that are part of the peer-to-peer network 102. The peer selects 406 at least two clubs of the peer-to-peer network 102 to join. In one embodiment, the clubs to join are recommended by the tracker 106. The peer requests and receives 408 from peers 108 of the list information on peers 108 that are part of each selected club. The peer creates 410 connections with peers 108 of each selected club.

Figure 5:
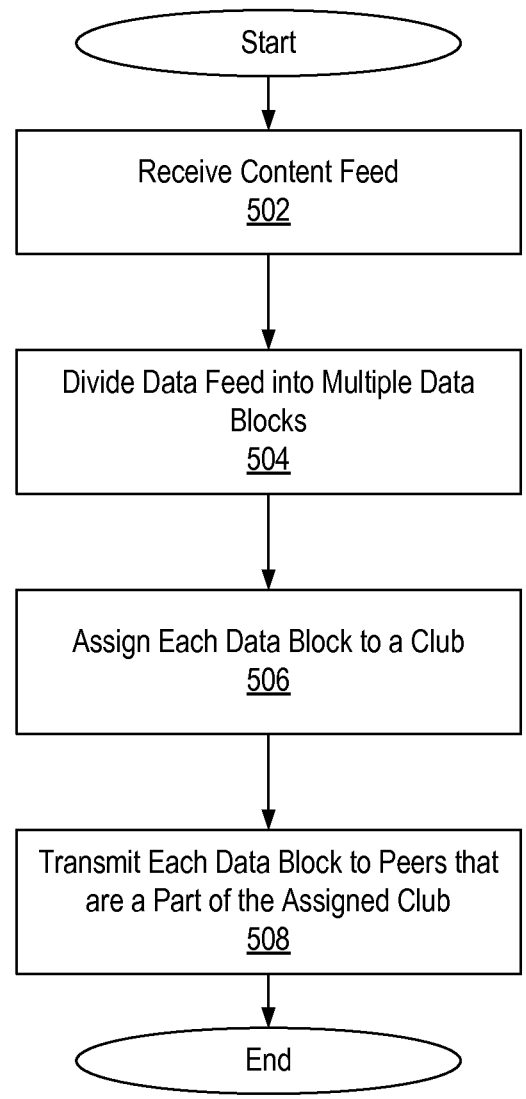
FIG. 5 is a flow chart illustrating a process of streaming content in a peer-to-peer network, according to one embodiment.

FIG. 5 is a flow chart illustrating a process 500 of streaming content in the peer-to-peer network 102 according to the peer-to-peer protocol. The source 104 receives 502 a content feed and divides 504 the feed into multiple data blocks. The source 104 assigns 506 each data block to one of the clubs of the peer-to-peer network 102. The source 104 transmits 508 each data block to peers 108 that are part of the assigned club.

Figure 6:
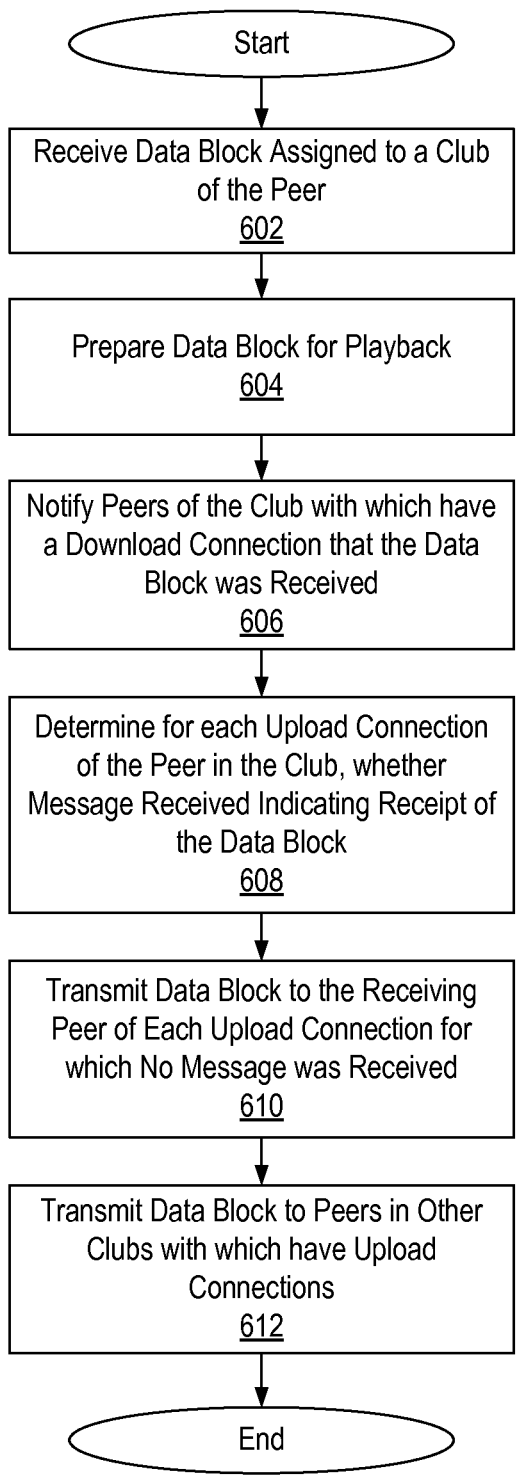
FIG. 6 is a flow chart illustrating a process of a peer distributing content received in a peer-to-peer network, according to one embodiment.

FIG. 6 is a flow chart illustrating a process 600 of a peer distributing in the peer-to-peer network content received according to the peer-to-peer protocol. The peer receives 602 a data block assigned to a club of the peer-to-peer network 102, the peer a part of the club. The peer prepares 604 the data block for playback. In one embodiment, prior to preparing the data block for playback, the peer authenticates the data block. The peer notifies 606 peers 108 of the club with which the peer has a download connection that the data block was received. The peer determines 608 for each upload connection the peer has in the club, whether a message was received from the receiving peer of the connection indicating that the data block has been received from another peer. The peer transmits 610 the data block to the receiving peer of each upload connection for which no message was received. The peer also transmits 612 the data block to peers 108 in other clubs 302 of the network 102 with which the peer has upload connections.

Those of skill in the art will recognize that other embodiments can perform the steps of FIGS. 4, 5, and 6 in different orders. Moreover, other embodiments can include different and/or additional steps than the ones described above.

Reference in the specification to "one embodiment" or to "an embodiment" means that a particular feature, structure, or characteristic is included in at least one embodiment described. The various appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Finally, it should be noted that the language used in the specification has been principally selected for readability and instructional purposes, and may not have been selected to delineate or circumscribe the subject matter described. Accordingly, the disclosure is intended to be illustrative, but not limiting, of the scope described.

What is claimed is:

1. A method for joining a peer-to-peer network according to a protocol, the method comprising:
   identifying, by a joining peer, a club of the peer-to-peer network to join, the peer-to-peer network including a plurality of clubs and a plurality of peers receiving streaming content distributed by a source, each of the plurality of clubs including a subset of the plurality of peers, and each of the plurality of peers part of at least two clubs;
   receiving, by the joining peer, identifying information for peers in the identified club;
   responsive to receiving the identifying information, requesting, by the joining peer, connection information from the peers in the identified club;
   responsive to requesting connection information, receiving, by the joining peer from each of the peers in the identified club, connection information including a number of connections the peer in the identified club has with other peers;
   randomly selecting, by the joining peer from the peers in the identified club, at least a first peer and a second peer with which to establish connections, the random selection proportionally weighted by the number of connections the first peer has with other peers as indicated by the received connection information and the number of connections the second peer has with other peers as indicated by the received connection information;
   responsive to randomly selecting the first peer and the second peer, establishing, by the joining peer, a first connection with the first peer and a second connection with the second peer;
   receiving, by the joining peer from the first peer via the first connection, a data block of streaming content assigned to the identified club; and
   responsive to receiving the data block from the first peer, notifying, by the joining peer, the second peer that the data block has been received.

2. The method of claim 1, further comprising:
   receiving, by the joining peer from a tracker, a list of peers in the peer-to-peer network; and
   requesting and receiving, by the joining peer from at least one peer in the list, the identifying information of a peer in the identified club.

3. The method of claim 1, wherein a tracker uses a load-balancing algorithm to recommend to the joining peer that the joining peer join the identified club.

4. The method of claim 1, further comprising:
   for each club from the plurality of clubs in the peer-to-peer network that the joining peer is not a part of, establishing a download connection with a peer in the club.

5. The method of claim 1, wherein the first connection and the second connection are download connections and the joining peer additionally establishes at least two upload connections with peers in the identified club.

6. The method of claim 1, wherein the data block of streaming content is live content.

7. The method of claim 1, wherein the identifying information for each of the peers in the identified club includes an IP address and port number of the peer.

8. The method of claim 1, wherein the connection information received from each of the peers in the identified club indicates the number of connections the peer has with other peers in the identified club.

9. The method of claim 1, wherein the connection information received from each of the peers in the identified club indicates the number of unidirectional download connections the peer has with other peers in the identified club, wherein the peer receives content through the unidirectional download connections.

10. The method of claim 1, wherein the connection information received from each of the peers in the identified club indicates the number of unidirectional upload connections the peer has with other peers in the identified club, wherein the peer shares content through the unidirectional upload connections.

11. The method of claim 1, wherein the connection information received from each of the peers in the identified club indicates the number of connections the peer has with other peers from the plurality of clubs.

12. The method of claim 1, wherein the second peer does not transmit data block to the joining peer based on the notification received from the joining peer.

13. A computer program product for joining a peer-to-peer network according to a protocol, the, the computer program product having a non-transitory computer-readable storage medium having computer program instructions for:
   identifying, by a joining peer, a club of the peer-to-peer network to join, the peer-to-peer network including a plurality of clubs and a plurality of peers receiving streaming content distributed by a source, each of the plurality of clubs including a subset of the plurality of peers, and each of the plurality of peers part of at least two clubs;

receiving, by the joining peer, identifying information for peers in the identified club;

responsive to receiving the identifying information, requesting, by the joining peer, connection information from the peers in the identified club;

responsive to requesting connection information, receiving, by the joining peer from each of the peers in the identified club, connection information including a number of connections the peer in the identified club has with other peers;

randomly selecting, by the joining peer from the peers in the identified club, at least a first peer and a second peer with which to establish connections, the random selection proportionally weighted by the number of connections the first peer has with other peers as indicated by the received connection information and the number of connections the second peer has with other peers as indicated by the received connection information;

responsive to randomly selecting the first peer and the second peer, establishing, by the joining peer, a first connection with the first peer and a second connection with the second peer;

receiving, by the joining peer from the first peer via the first connection, a data block of streaming content assigned to the identified club; and responsive to receiving the data block from the first peer, notifying, by the joining peer, the second peer that the data block has been received.

\* \* \* \* \*